United States Patent [19]

Peschka et al.

[11] Patent Number: 5,718,819
[45] Date of Patent: Feb. 17, 1998

[54] PROCESS AND ELECTROLYZER FOR THE ELECTROLYSIS OF A FLUID ELECTROLYTE

[75] Inventors: Walter Peschka, Sindelfingen; Gottfried Schneider, Stuttgart, both of Germany

[73] Assignee: Deutsche Forschungsanstalt fuer Luft- und Raumfahrt e.V., Bonn, Germany

[21] Appl. No.: 600,679

[22] Filed: Feb. 13, 1996

[30] Foreign Application Priority Data

Feb. 13, 1995 [DE] Germany ............ 195 04 632.3

[51] Int. Cl.$^6$ .................... C02F 1/46; B01D 17/06
[52] U.S. Cl. .................... 205/339; 205/628; 205/637; 205/745; 204/155; 204/660; 204/666; 204/672; 204/673; 204/DIG. 5
[58] Field of Search .................... 205/339, 628, 205/637, 745; 204/155, 660, 666, 672, 673, DIG. 5

[56] References Cited

U.S. PATENT DOCUMENTS 4,747,925  5/1988  Hasebe et al. ............ 204/DIG. 5

FOREIGN PATENT DOCUMENTS

| 2 398 119 | 2/1979 | France . |
| 27 33 444 | 2/1979 | Germany . |
| 28 19 739 | 11/1979 | Germany . |
| 28 19 740 | 11/1979 | Germany . |
| 30 31 673 A1 | 4/1982 | Germany . |
| 36 18 119 A1 | 12/1987 | Germany . |
| 2001675 | 2/1979 | United Kingdom . |

Primary Examiner—Arun S. Phasge
Attorney, Agent, or Firm—Barry R. Lipsitz

[57] ABSTRACT

In order to improve a process for the electrolysis of a fluid electrolyte containing cations and anions in an electrolytic cell with a cathode and an anode located opposite the cathode such that primary energy not present in an electrical form, in particular thermal energy from reservoirs having a moderately high temperature, can be used for the electrolysis with lower losses, it is suggested that a current path between the cathode and the anode be closed, that a magnetic field be applied to the electrolytic cell and that a relative movement between the magnetic field and the electrolyte be generated so that on account of the effect of Lorentz forces the cations migrate to the cathode and the anions to the anode and products of electrolysis be formed on the cathode and on the anode in electrolytic reactions, wherein the charge equalization necessary for the electrolytic reactions be carried out by the current path closed between the cathode and the anode.

37 Claims, 5 Drawing Sheets

PROCESS AND ELECTROLYZER FOR THE ELECTROLYSIS OF A FLUID ELECTROLYTE

The present invention relates to a process for the electrolysis of a fluid electrolyte containing cations and anions in an electrolytic cell with a cathode and an anode located opposite the cathode.

A large number of processes for electrolysis of this type are known.

In the known processes for electrolysis, an electrical field is generated between the cathode and the anode by means of an external voltage source. In this electrical field, the cations migrate to the cathode and the anions to the anode due to the effect of electrostatic forces. The energy to be used for the electrolysis of the electrolyte is thereby taken from the electrical field and must, therefore, be available in the form of electrical energy.

Normally, the energy available is not, however, primarily present in the form of electrical energy but, for example, in the form of thermal energy. For use in the conventional processes for electrolysis, the primary energy must then be converted first of all into electrical energy which, as is well known, entails significant losses in energy. The use, in particular, of thermal energy from heat reservoirs with temperatures in the moderately high range (approximately 200° to 400° C.) thus becomes unprofitable.

The object underlying the invention was therefore to improve an inventive process for the electrolysis of a fluid electrolyte such that primary energy not present in an electrical form, in particular thermal energy from reservoirs having a moderately high temperature, can be used for the electrolysis with lower losses.

This object is accomplished in accordance with the invention, in a process for electrolysis of the type described at the outset, in that a current path between the cathode and the anode is closed, that a magnetic field is applied to the electrolytic cell and that a relative movement between the magnetic field and the electrolyte is generated so that on account of the effect of Lorentz forces the cations migrate to the cathode and the anions to the anode and products of electrolysis are formed on the cathode and on the anode in electrolytic reactions, wherein the charge equalization necessary for the electrolytic reactions is carried out by the current path closed between the cathode and the anode.

With the inventive concept it is possible to omit an external electrical field. It is, therefore, no longer necessary to convert the primary energy into electrical energy, and the losses connected with this conversion are avoided.

Moreover, the amount of apparatus required is reduced since no generator or other source of electrical energy is necessary to carry out the inventive process.

The migration of the cations to the cathode and of the anions to the anode is brought about by Lorentz forces in the magnetic field which, itself, does not carry out any work on the anions or cations and from which no energy is, therefore, removed for the electrolysis.

Rather, the energy required is taken directly from the kinetic energy of the relative movement between the magnetic field and the electrolyte.

The relative movement between the magnetic field and the electrolyte can, in principle, consist in any optional manner of movements of the magnetic field and the electrolyte.

It is, however, of advantage when the magnetic field is stationary and the electrolyte is moved relative to the magnetic field. A flow of the fluid electrolyte can be generated in a simple manner, and a stationary device for generating a magnetic field is easier to construct than a movable one and is subject to wear and tear to a lesser extent.

It is particularly favorable when the flow rate of the electrolyte relative to the magnetic field is at least 20 m/s and the component of the magnetic field at right angles to the flow rate of the electrolyte is at least two Tesla. The Lorentz forces acting at such a flow rate of the electrolyte and with such a magnetic field allow the electrolysis to be carried out in electrolytic cells with compact dimensions.

The magnetic field is advantageously generated by superconducting coils. With coils of this type it is also possible to maintain high magnetic fields in an economic manner since no additional losses of ohmic resistances occur.

In addition, it is of advantage when a liquid is used as electrolyte. In the liquid state, the ion densities are greater than in the gaseous state and so a larger quantity of products of electrolysis can be formed per unit of time.

It is particularly advantageous when such a high pressure is generated in the electrolytic cell and/or such a flow rate of the electrolyte relative to the electrodes that the products of electrolysis essentially do not mix with one another. In this case, a diaphragm in the electrolytic cell, which would represent an additional resistance for the electrolyte flow and, in addition, limit the useful life of the electrolytic cell, can be omitted.

The turnover in products of electrolysis may be increased in a simple manner when several electrolytic cells each advantageously have a branch flow of the electrolyte flowing through them. By closing inlet openings of individual electrolytic cells, it is possible to adjust the quantity of products of electrolysis resulting per unit of time to the requirements.

It is favorable when the electrolyte is conveyed in a circuit. This means that the kinetic energy contained in the electrolyte flow can be utilized in an optimum manner.

No details have so far been given concerning the type of generation of the electrolyte flow.

The flow of the electrolyte can be generated in a simple manner with the aid of a mechanical pump which is driven by a thermal engine or by water power depending on the type of primary energy available.

It can also be advantageously provided for the flow of the electrolyte to be generated with the aid of a magnetohydrodynamic pump. Such a pump does not contain any movable components which would be subject to heavy wear and tear.

As a magnetohydrodynamic pump is driven with electrical energy, it is preferably used in addition to a pump driven by a different type of energy in order to replace the latter during any failure.

It is particularly advantageous to generate the flow of the electrolyte with the aid of a steam jet injector. The steam jet can be generated by evaporating a liquid by adding heat from a heat reservoir with a moderately high temperature.

In this respect, it is favorable when the injected steam is generated by partially evaporating the electrolyte. In this case, the substance introduced into the electrolyte with the aid of a steam jet injector is withdrawn from the electrolyte by evaporation prior to or following the injection so that, altogether, the composition of the electrolyte remains unchanged.

If an aqueous solution is used as electrolyte, this has the advantage that the solvent water can already be evaporated at moderately high temperatures at atmospheric pressure.

It is particularly advantageous to use an azeotropic mixture as electrolyte since, in this case, the percentage composition of the electrolyte during evaporation is maintained and no electrolytic brine, which could, in certain circumstances, be chemically aggressive, is formed.

It is favorable when the heat required for generating the injected steam is taken from a heated working medium, for example steam or compressed water, of a conventional or nuclear thermal power station. During a weak load period of such a power station the heated working medium can be branched off instead of, as usual, being supplied to turbines of the power station and then conveyed through a heat exchanger in order to evaporate the liquid to be evaporated, for example the electrolyte, and drive the steam jet injector with the steam thus generated. In this way, it is possible to avoid, for example, running down the steam generators of the thermal power station during weak load periods, which is of considerable advantage, in particular, for nuclear power stations.

It is also favorable when the heat required for generating the injected steam is obtained from solar energy or geothermally. Both sources of energy allow heat to be made available at a moderately high temperature level, which is sufficient for generating steam, in particular, from aqueous solutions, in a manner which is economic and conserves the environment.

Particularly when using solar energy, it is advantageous to store the heat required for the steam generation temporarily in a heat storage unit. As a result of this measure, it is possible to carry out the steam generation and, therefore, the inventive process for electrolysis continuously and independently of the momentary solar radiation.

If the flow of the electrolyte is generated with the aid of a steam jet injector, it is, furthermore, of advantage when the electrolyte is cooled prior to the injection of the steam such that the injected steam condenses essentially completely in the electrolyte. As a result of this, it is ensured that the impulse of the steam is transferred to the electrolyte as completely as possible, and the formation of gas bubbles in the electrolyte, which could reduce the effectiveness of the process for electrolysis and, in certain circumstances, damage the devices used for the process, is prevented.

In a preferred embodiment of the inventive process, the energy stored in the magnetic field is, moreover, used in the case of electrolyzers of adequate size for the peak load service in electrical networks.

The inventive process for electrolysis described in the above is particularly suitable for use in the production of hydrogen by means of electrolytic dissociation of water. Such use exploits the advantages of the inventive process in an optimum manner and enables primary energy in a non-electrical form, in particular thermal energy from heat reservoirs having a moderately high temperature, to be converted into a form which is easy to store and transport with a high degree of efficiency in comparison with conventional processes.

Furthermore, the object described at the outset is also accomplished in accordance with the invention, by an electrolyzer for the electrolysis of a fluid electrolyte which has an electrolytic cell with a cathode and an anode located opposite the cathode, in that the electrolyzer has a conductive connection between the cathode and the anode, a device for generating a magnetic field penetrating the electrolytic cell and a device for generating a relative movement between the magnetic field and the electrolyte.

In the inventive electrolyzer, Lorentz forces, which act on the cations and the anions of the electrolyte due to the relative movement between the magnetic field and the electrolyte, are generated and these see to it that the cations migrate to the cathode and the anions to the anode and products of electrolysis are formed on the cathode and the anode in electrolytic reactions, wherein the charge equalization necessary for the electrolytic reactions is carried out by the current path closed between the cathode and the anode.

The inventive electrolyzer therefore offers the advantage that an external electrical field for separating the cations and anions of the electrolyte can be dispensed with. Thus, non-electrical sources of primary energy can be used for the operation of the electrolyzer without any conversion into electrical energy being necessary beforehand, which would entail additional apparatus and losses in energy.

The required relative movement between the magnetic field and the electrolyte can, in principle, consist of a movement of the magnetic field and a movement of the electrolyte.

As a rule, it is, however, favorable to leave the device for generating the magnetic field stationary and, instead, provide a device for generating an electrolyte flow.

The electrolyzer advantageously has at least one superconducting magnetic coil. Superconducting magnetic coils allow the magnetic field required for generating the Lorentz forces to be maintained over a long period of time more or less without loss.

It is favorable when the electrolytic cell of the electrolyzer is filled with a liquid electrolyte. On account of the distinctly higher ion density in a liquid electrolyte in comparison with a gaseous electrolyte, a greater quantity of products of electrolysis can be obtained per unit of time from a liquid electrolyte.

It likewise serves to increase the production rate of products of electrolysis when the electrolyzer has several electrolytic cells.

These electrolytic cells can, for example, be arranged linearly next to one another in order to be able to keep the conductive connections between the anode of one electrolytic cell and the cathode of the electrolytic cell adjacent to this electrolytic cell short. A longer, conductive connection is required only between the outwardly situated electrodes of the two electrolytic cells located at the ends of the linear arrangement.

Such a longer conductive connection can be dispensed with when the electrolytic cells are favorably arranged in the shape of a closed ring. In this case, two additional electrolytic cells are adjacent to each of the electrolytic cells. Furthermore, the forces transferred from an electrolyte flow to the ring-shaped arrangement consisting of electrolytic cells cancel each other when the electrolytic cells have the electrolyte flowing through them in the same direction (i.e., for example, from the inner side of the ring-shaped arrangement to its outer side).

In each arrangement of electrolytic cells, in which two electrolytic cells are adjacent one another each time, it is of advantage when these electrolytic cells have bipolar electrodes which serve not only as anode of the one electrolytic cell but also as cathode of the other electrolytic cell. As a result, a considerable saving in material is possible.

If the electrolyzer has a device for generating an electrolyte flow, it is, furthermore, of advantage when the electrolyzer has an electrolyte circuit with an electrolyte return line. Due to this it is possible to supply new electrolyte continuously to the electrolyzer and to electrolyze this completely during several passages through the electrolytic cell.

No details have so far been given in respect of the device for generating an electrolyte flow.

In principle, all devices provided for generating a fluid flow can be used.

It is advantageous when the electrolyzer has a magnetohydrodynamic pump for generating the electrolyte flow. Such a pump has no movable parts which means low maintenance requirements and a high service life.

It is particularly favorable when the electrolyzer has a steam jet injector for generating the electrolyte flow. The injected steam can be generated by means of heat in the medium temperature range, of approximately 200° to 400° C., whereby such heat reservoirs can be used for the operation of the electrolyzer without prior conversion into electrical energy.

In conjunction with a steam jet injector it is of advantage when the electrolyzer has an evaporator for the partial evaporation of the electrolyte. This means that it is possible to generate the steam injected into the electrolyte by the steam jet injector from the electrolyte itself and so no additional liquid need be made available for the evaporation and the electrolyte is not diluted by foreign substances which would have to be removed from it again following the steam jet injection.

If the electrolyte itself is partially evaporated, it is favorable when the electrolyte is an aqueous solution. The water contained in the electrolyte may be easily evaporated by means of heat supplied in the medium temperature range, of approximately 200° to 400° C., and forms steam which is chemically reactive to a comparatively small extent.

If the electrolyte to be partially evaporated represents an azeotropic mixture, this offers the advantage that the formation of electrolyte brine in the evaporator is avoided.

No details have so far been given with respect to the origin of the thermal energy required for the evaporation.

In principle, every heat reservoir having a temperature level which is above the condensation temperature of the steam to be generated can be considered.

When the electrolyzer advantageously has a radiation absorber for absorbing solar energy, such a heat reservoir can be made available in an environmentally unharmful manner.

It is particularly favorable when the electrolyzer has, apart from the radiation absorber, a heat storage unit for temporarily storing the thermal energy absorbed by the radiation absorber. Such a heat storage unit allows a continuous operation of the electrolyzer independent of the momentary solar radiation.

Finally, it is of advantage when using a steam jet injector for generating the electrolyte flow when the electrolyzer has a device for cooling the electrolyte which is arranged in front of the steam jet injector in the flow direction of the electrolyte. Due to the cooling of the electrolyte prior to the steam jet injection it is possible for the injected jet of steam to be condensed completely in the electrolyte, whereby the impulse contained in the steam jet is transferred completely to the electrolyte and the formation of steam bubbles is avoided.

Additional features and advantages of the invention are the subject matter of the following description as well as the drawings of two embodiments.

Figure 1:
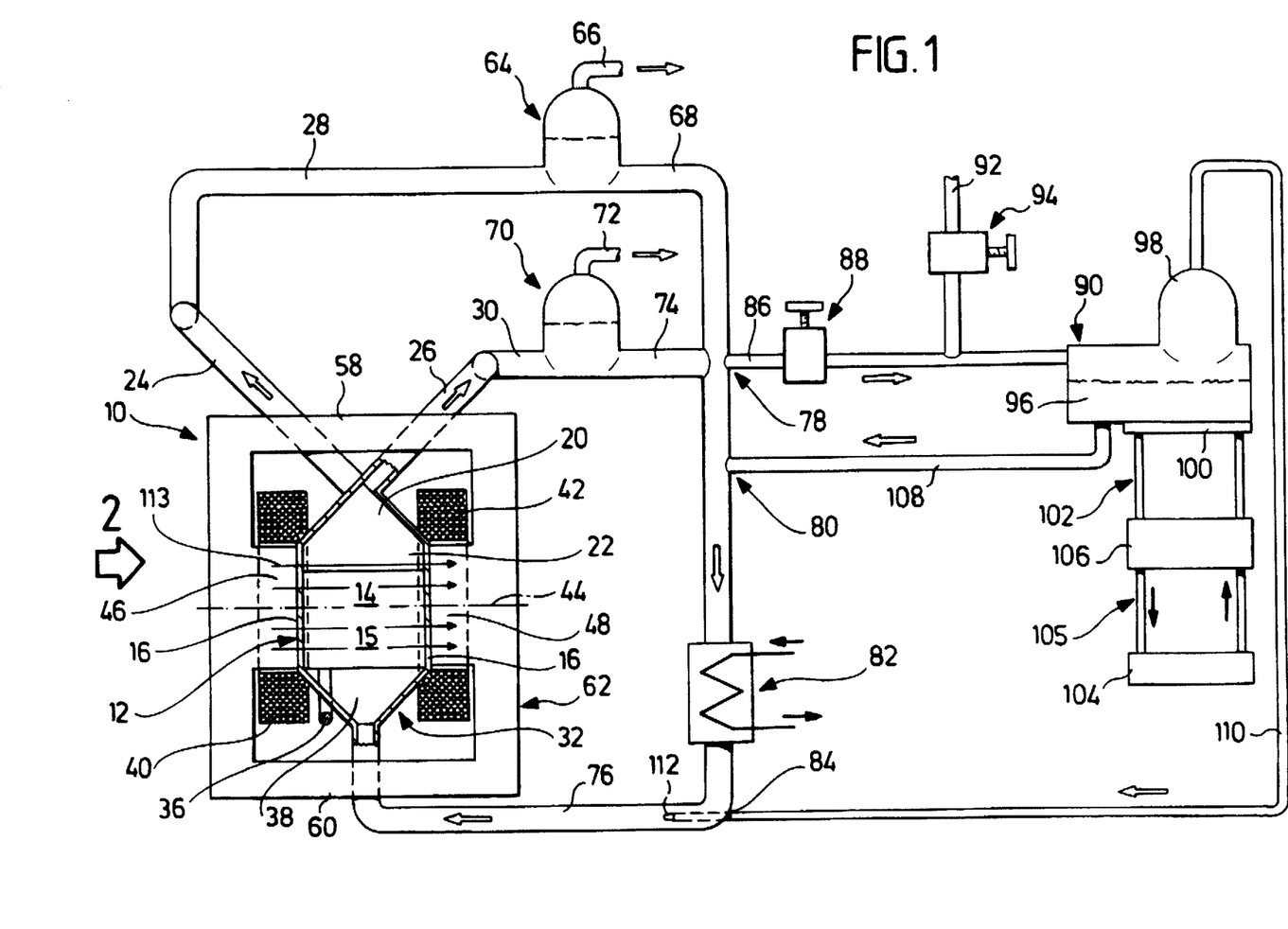
FIG. 1 is a schematic illustration of a first embodiment of an inventive electrolyzer for the electrolysis of such aqueous electrolytes, with which oxygen and hydrogen result during their electrolysis, with an electrolysis unit, in which several electrolytic cells are arranged linearly next to one another, the viewing direction extending at right angles to the magnetic field.
Figure 2:
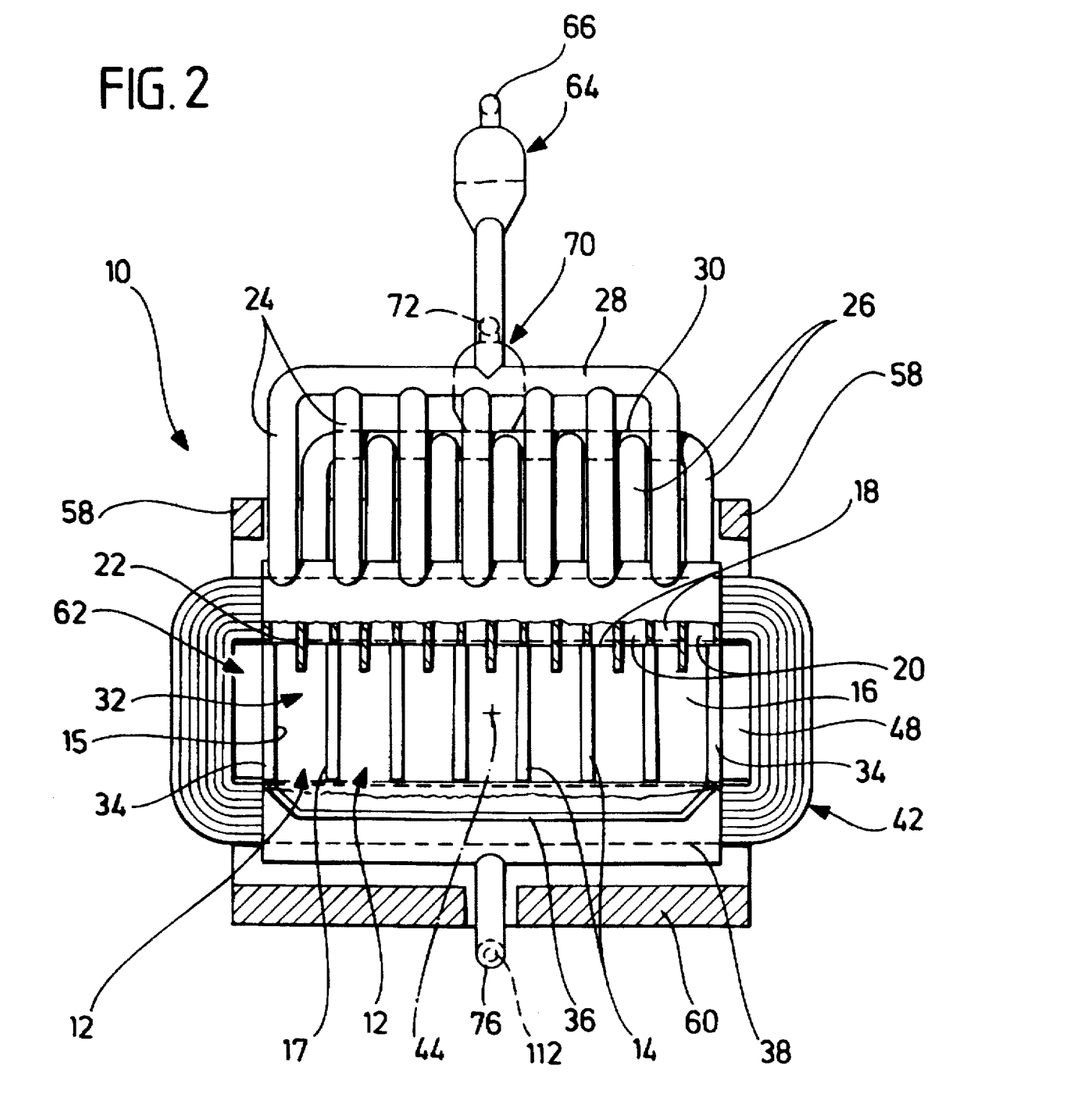
FIG. 2 is a section from a side view of the inventive electrolyzer from FIG. 1, with the viewing direction being along the arrow designated as 2 in FIG. 1.

A first embodiment, illustrated in FIGS. 1 and 2, of an electrolyzer designated as a whole as 10 has seven electrolytic cells 12. Each of the electrolytic cells 12 has the shape of a parallelepiped with three different edge lengths, the longest edges being vertically aligned. Two vertical side walls of the electrolytic cell 12, which are located opposite one another, are formed by electrodes 14, for example made of nickel or with a corresponding surface coating. Two additional, narrower vertical side walls 16 of the electrolytic cell 12, which consist of a non-conductive material impermeable to electrolyte, extend between the electrodes 14.

A top surface of the electrolytic cell 12 is open towards an outlet funnel for electrolyte containing hydrogen 18 and towards an outlet funnel for electrolyte containing oxygen 20. Each of the outlet funnels 18, 20 has the shape of a saddle roof open at the base and having a ridge length which corresponds approximately to half the distance between the electrodes 14 of an electrolytic cell 12. The outlet funnels 18, 20 are each seated on one electrode 14 and the two side walls 16 of an electrolytic cell 12 in such a manner that their gable walls 21 are aligned parallel to the electrodes 14 and each of the outlet funnels 18, 20 covers one half of the top surface of the electrolytic cell 12. Facing gable walls 21 of the two outlet funnels 18, 20 abut sealingly on one another and form a partition wall 22 which is extended downwards so that it protrudes into the electrolytic cell 12 over approximately one quarter of the height thereof.

Next to the ridge of the outlet funnel for electrolyte containing hydrogen 18, a discharge pipe for electrolyte containing hydrogen 24 opens into the outlet funnel 18. Another end of the discharge pipe for electrolyte containing hydrogen 24 is connected to a collecting pipe for electrolyte containing hydrogen 28.

A discharge pipe for electrolyte containing oxygen 26 opens into the outlet funnel for electrolyte containing oxygen 20 next to a ridge of the outlet funnel 20. Another end of the discharge pipe for electrolyte containing oxygen 26 is connected to a collecting pipe for electrolyte containing oxygen 30.

Figure 3:
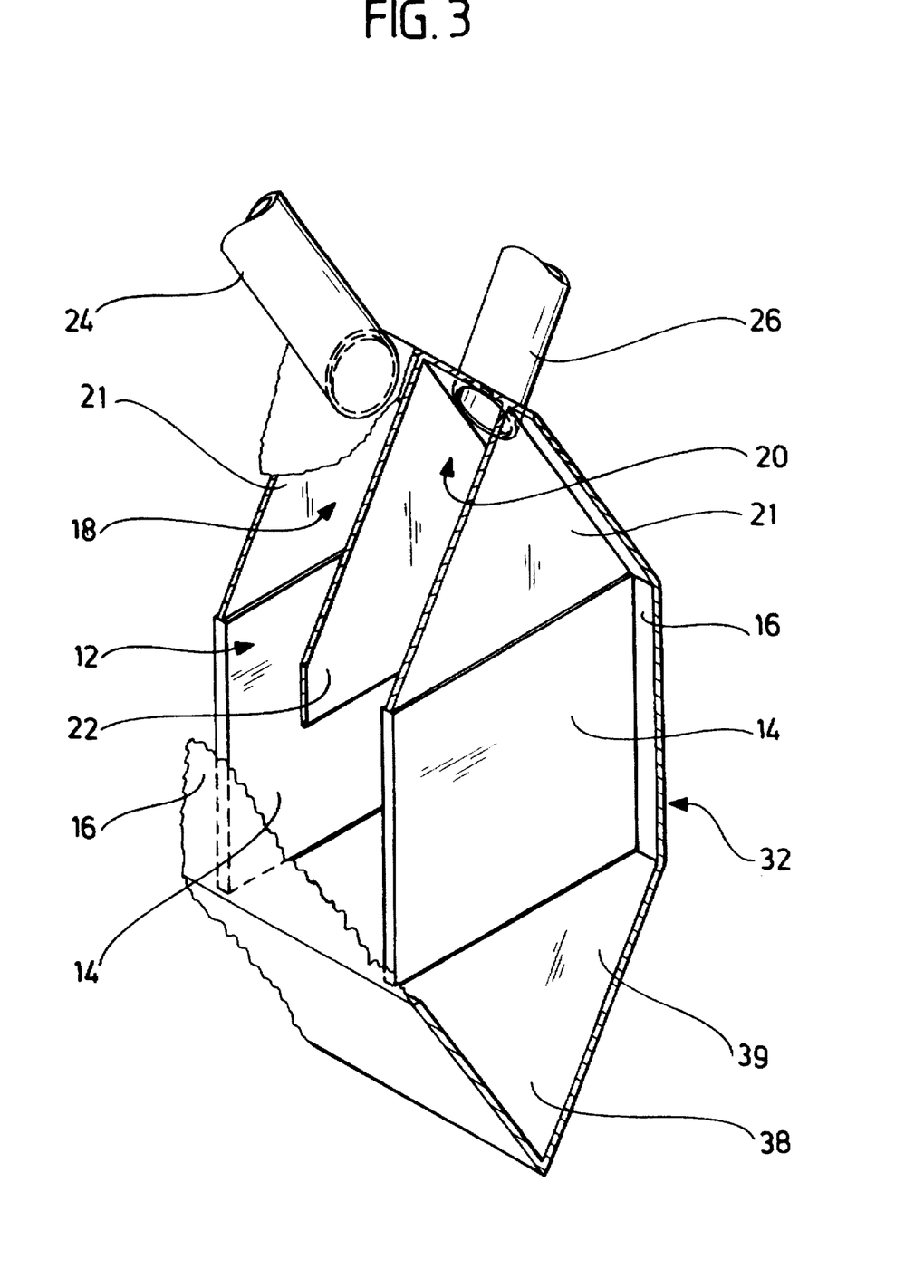
FIG. 3 is a perspective illustration of one of the electrolytic cells of the inventive electrolyzer from FIG. 1.

An arrangement which comprises one electrolytic cell 12, two electrodes 14, two side walls 16, two outlet funnels 18, 20 as well as two discharge pipes 24, 26 will be designated in the following as a whole as electrolysis element 32 and is illustrated in FIG. 3. Several such electrolysis elements 32 are arranged linearly next to one another in such a way that one of the electrodes 14 is common to respectively adjacent electrolysis elements and that corresponding components of adjacent electrolysis elements 32 are aligned parallel to one another.

Outwardly located electrodes 34 in this linear arrangement of outwardly located electrolysis elements 32 are connected with one another via a short-circuit line 36 having a high electrical conductivity.

Bottom surfaces of the electrolytic cells 12 of all the electrolysis elements 32 are open towards a common inlet funnel 38. The inlet funnel 38 has the shape of a saddle roof which has been turned upside down, is open at the base and has a ridge length which corresponds approximately to the sum of the thicknesses of all the electrodes 14 and the sum of all the distances between two respectively adjacent electrodes 14. The inlet funnel 38 supports the electrodes 14 and the side walls 16 of all the electrolysis elements 32 in such a way that gable walls 39 of the inlet funnel 38 are arranged parallel to the electrodes 14 and the inlet funnel 38 completely covers the bottom surfaces of the electrolytic cells 12 of all the electrolysis elements 32.

The electrolysis elements 32 are arranged between two superconducting magnetic coils 40, 42 having rectangular coil cross sections which are the same as one another and a common coil axis 44, the common coil axis 44 being aligned parallel to the surface normals of the side walls 16 of the electrolytic cells 12.

Each of the magnetic coils 40, 42 has a coil interior, the height of which corresponds to the height of an electrolytic cell 12 and the width of which (at right angles to the coil axis 44) is somewhat larger that the ridge length of the inlet funnel 38. Furthermore, the coil axis 44 extends through the center point of the side walls 16 of the middle one of the seven linearly arranged electrolytic cells 12 so that during a parallel projection of the electrolytic cells 12 along the coil axis 44 onto the plane of a coil cross section, the projections of all the electrolytic cells 12 come to rest within the coil cross section.

Interiors of the coils 40, 42 are filled with a respective coil core 46, 48 made of a ferromagnetic material. The coil cores 46, 48 are connected with one another in the outer region of the coils 40, 42 via yokes 58, 60 made of ferromagnetic material and form with these yokes a magnetic circuit designated as a whole as 62.

The collecting pipe for electrolyte containing hydrogen 28 opens into a hydrogen separator 64. The hydrogen separator 64 has a hydrogen removal line 66 and an outlet opening for electrolyte, to which an intermediate line 68 is connected.

The collecting pipe for electrolyte containing oxygen 30 opens into an oxygen separator 70. The oxygen separator 70 has an oxygen removal line 72 and an outlet opening for electrolyte, to which an intermediate line 74 is connected.

The intermediate lines 68 and 74 join to form an electrolyte return line 76. The electrolyte return line 76 opens into the inlet funnel 38 so that a closed electrolyte circuit results.

Between its beginning and its end the return line 76 has in the specified sequence a branch for electrolyte 78, a junction for electrolyte brine 80, a cooler 82 and an inlet opening 84 for a steam jet injector.

An electrolyte supply line 86, which has a flow-volume regulator 88, leads from the branch for electrolyte 78 to an inlet opening of an evaporator 90.

A water supply line 92, which has a water inflow regulator 94, opens into the electrolyte supply line 86 between the flow-volume regulator 88 and the inlet opening of the evaporator 90.

An interior of the evaporator 90 comprises a volume of electrolyte 96 in a lower part of the interior and a volume of steam 98 filling the remainder of the interior. Heating pipes 100 are arranged in a bottom of the evaporator 90 and are part of a circuit for heat storage medium 102 which has, in addition, a heat storage unit 106.

A second circuit for heat storage medium 105 leads out of the heat storage unit 106 through a radiation absorber 104 for solar radiation and back into the heat storage unit 106.

Moreover, the evaporator 90 has an outlet opening on the side of the electrolyte volume, from which a return line for electrolyte brine 108 leads to the junction for electrolyte brine 80 of the electrolyte return line 76.

Furthermore, the evaporator 90 has an additional outlet opening on the side of the steam volume, from which a steam line 110 leads to a steam jet injector 112 which is guided into the electrolyte return line 76 through the inlet opening 84 for the steam jet injector so as to be electrolyte-tight.

During the operation of the electrolyzer 10, the electrolytic cells 12, the intermediate lines 68, 74, the electrolyte return line 76, the electrolyte supply line 86 and the inlet funnel 38 are filled with an aqueous solution of approximately 20 atomic percent of sodium hydroxide as electrolyte. The sodium hydroxide is thereby dissociated to a large extent into $Na^+$ and $OH^-$ ions.

The outlet funnels for electrolyte containing hydrogen 18, the discharge pipes for electrolyte containing hydrogen 24, the collecting pipe for electrolyte containing hydrogen 28 and the hydrogen separator 64 contain the electrolyte with molecular hydrogen dissolved therein.

The outlet funnels for electrolyte containing oxygen 20, the discharge pipes for electrolyte containing oxygen 26, the collecting pipe for electrolyte containing oxygen 30 and the oxygen separator 70 contain the electrolyte with molecular oxygen dissolved therein.

The electrolyte volume 96 of the evaporator 90 and the return line for electrolyte brine 108 contain the electrolyte with a reduced water concentration (electrolyte brine).

The steam volume 98 of the evaporator 90 and the steam line 110 contain steam.

The hydrogen removal line 66 of the hydrogen separator 64 contains hydrogen gas.

The oxygen removal line 72 of the oxygen separator 70 contains oxygen gas.

The electrolyte flows through the electrolyte return line 76 in the direction specified by arrows in FIG. 1. A branch flow of the electrolyte passes from the electrolyte branch 78 through the electrolyte supply line 86 into the evaporator 90. The size of this branch flow can be controlled with the aid of the flow-volume regulator 88.

An amount of water corresponding to that split into hydrogen and oxygen during the electrolysis is added to the electrolyte per unit of time via the water supply line 92 and with the aid of the water inflow regulator 94 in order to facilitate a continuous operation.

Thermal energy is passed to the electrolyte volume 96 in the evaporator 90 from a heat storage medium at a temperature level of 200° to 300° C., which flows in the circuit for heat storage medium 102 from the heat storage unit 106 through the heating pipes 100 and back into the heat storage unit 106.

During favorable solar radiation conditions, the heat medium is conveyed in the second circuit for heat storage medium 105 through the radiation absorber 104 in order to compensate for the heat loss in the heat storage unit 106.

Part of the water contained therein is evaporated out of the heated electrolyte volume 96, passes into the steam volume 98 and escapes into the steam line 110. The electrolyte brine remaining in the electrolyte volume 96 passes via the return line for electrolyte brine 108 through the junction for electrolyte brine 80 and back into the main flow of the electrolyte in the electrolyte return line 76.

The electrolyte flow reunited at the junction for electrolyte brine 80 is cooled in the cooler 82 with the aid of a coolant, the temperature level of which corresponds to the ambient temperature.

The steam from the steam line 100 is blown into the cooled electrolyte flow by the steam jet injector 112. The electrolyte is thereby subjected to pressure and accelerated in the direction of flow. The steam blown in condenses completely in the cooled electrolyte.

The electrolyte flow driven in this manner passes through the inlet funnel 38 into the electrolytic cells 12 of the electrolysis element 32. The current-carrying, superconducting magnetic coils 40 and 42 generate a magnetic field of two to four Tesla in the electrolytic cells 12 in conjunction with the magnetic circuit 62 and this magnetic field is aligned parallel to the coil axis 44 and essentially normal to the flow rate of the electrolyte (20 to 30 m/s).

Lorentz forces therefore act on the $Na^+$ and $OH^-$ ions entrained in the electrolyte flow essentially parallel to the directions of the normals of the electrode surfaces. The $Na^+$ ions consequently migrate to cathode surfaces 15, the $OH^-$ ions in the opposite direction to anode surfaces 17 of the electrodes 14, 34 of the electrolysis cells 12. The reactions $$4Na^+ + 4e^- \rightarrow 4Na$$

$$4Na + 4H_2O \rightarrow 4Na^+OH^- + 2H_2$$

take place at the cathode surfaces 15 and during their course molecular hydrogen is formed which dissolves in the electrolyte flowing past the cathode surfaces 15. The reaction $$4OH^- \rightarrow 4e^+ + O_2 + 2H_2O$$

takes place at the anode surfaces 17 and during its course molecular oxygen is formed which dissolves in the electrolyte flowing past the anode surfaces 17.

The electrons required at the cathode surface 15 of an electrode 14 are supplied by the anode surface 17 of the same electrode. The electron equalization between the cathode and anode surfaces of the outwardly lying electrodes 34 is carried out via the short-circuit line 36.

As a result of the high flow rate of the electrolyte in conjunction with a high pressure prevailing in the electrolyte, the gases resulting at the electrode surfaces remain essentially restricted to the immediate electrode area and there is no risk of any mixing of the resulting gases.

The partition wall 22 divides the electrolyte flows at the exit of the electrolytic cells 12 into two branch flows each, namely an electrolyte flow containing hydrogen and an electrolyte flow containing oxygen.

The electrolyte flows containing hydrogen pass through the outlet funnels for electrolyte containing hydrogen 18 and the discharge pipes for electrolyte containing hydrogen 24 into the collecting pipe for electrolyte containing hydrogen 28. From the collecting pipe for electrolyte containing hydrogen 28, the electrolyte containing hydrogen passes into the hydrogen separator 64 where the gaseous hydrogen is separated off and removed via a hydrogen removal line 66.

The electrolyte flows containing oxygen pass through the outlet funnels for electrolyte containing oxygen 20 and the discharge pipes for electrolyte containing oxygen 26 into the collecting pipe for electrolyte containing oxygen 30. From the collecting pipe for electrolyte containing oxygen 30, the electrolyte containing oxygen passes into the oxygen separator 70 where the gaseous oxygen is separated off and removed via the oxygen removal line 72.

The degassed electrolyte flows are reunited in the electrolyte return line 76 after passing through the intermediate lines 68 and 74, respectively, and the circulation of the electrolyte beings anew.

Figure 4:
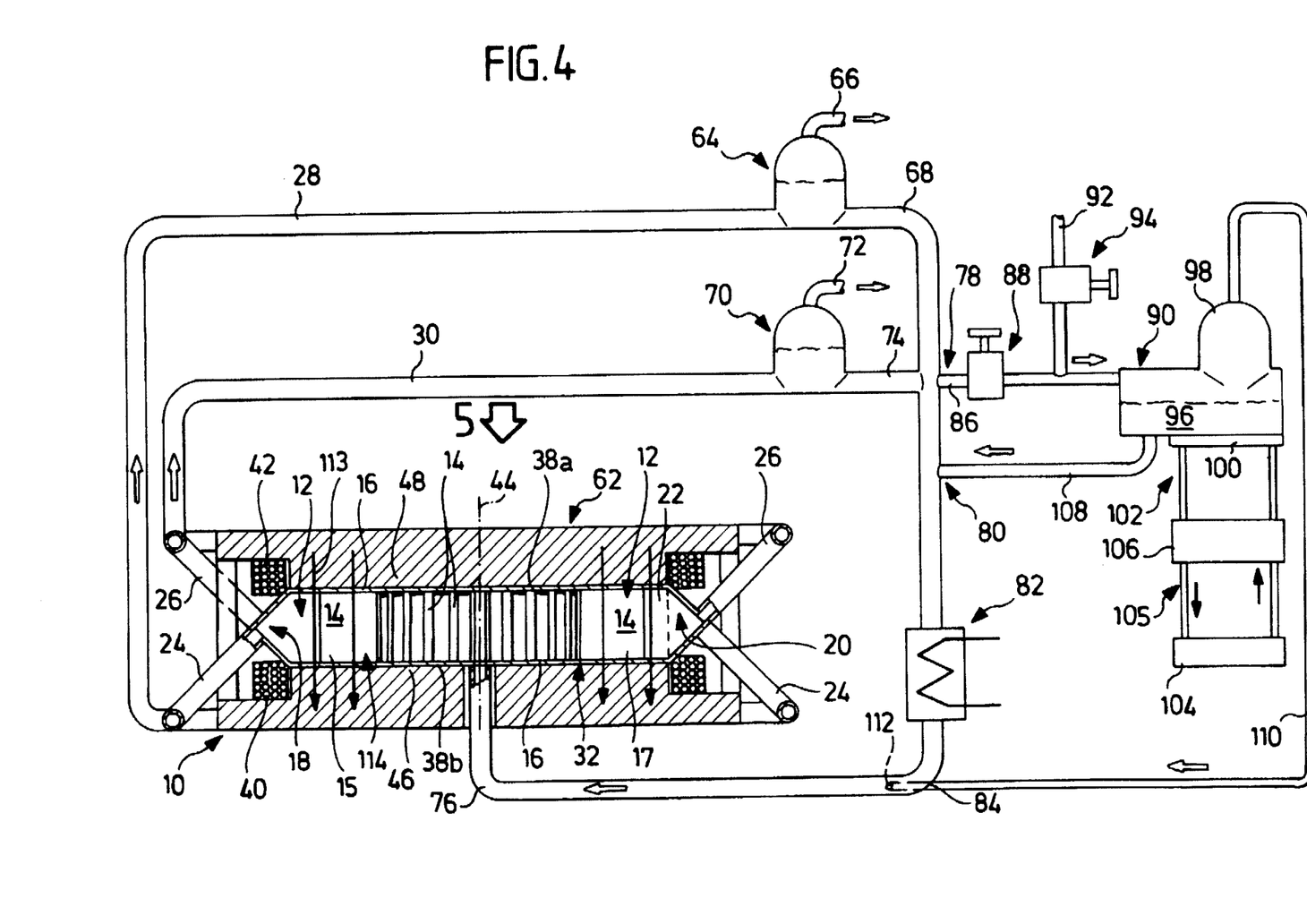
FIG. 4 is a schematic illustration of a second embodiment of an inventive electrolyzer for the electrolysis of such aqueous electrolytes, with which oxygen and hydrogen result during their electrolysis, with an electrolysis unit, in which several electrolytic cells are arranged in the shape of a closed ring.
Figure 5:
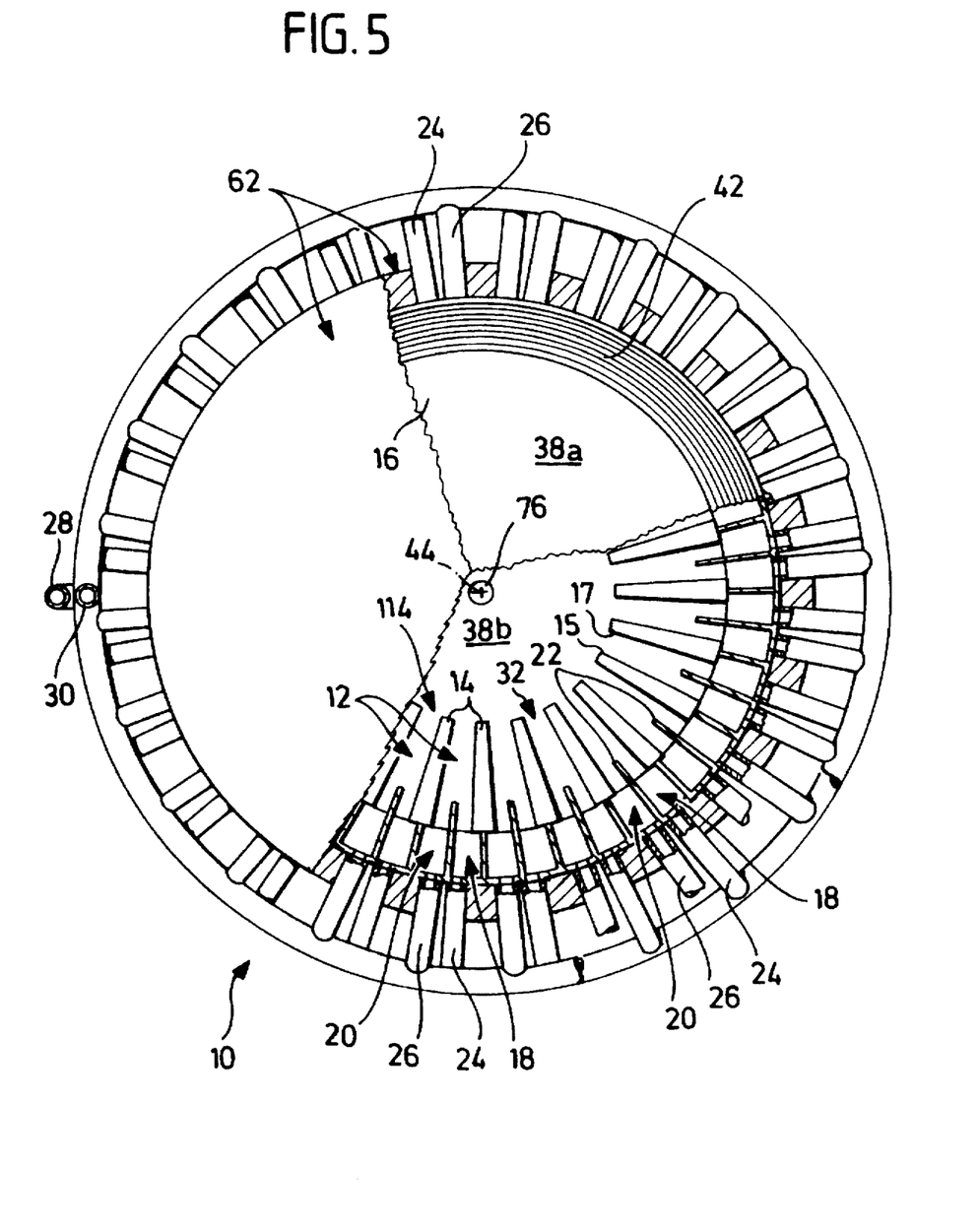
FIG. 5 is a section from a plan view of the inventive electrolyzer from FIG. 4, with the viewing direction being along the arrow designated as 5 in FIG. 4.

An additional embodiment of an inventive electrolyzer 10 with an alternative arrangement of the electrolysis elements 32 is illustrated in FIGS. 4 and 5. The same or functionally equal components are designated in FIGS. 4 and 5 with the same reference numerals as in FIGS. 1, 2 and 3.

This second embodiment of the electrolyzer 10 differs from the embodiment described thus far in that the linear arrangement of the electrolysis elements 32 is replaced by an arrangement in the shape of a closed ring (ring 114).

The individual electrolysis elements 32 are constructed in the manner described above. The electrolysis elements 32 are arranged such that the side walls 16 are aligned horizontally, open bottom surfaces of the electrolytic cells point into an interior of the ring 114 and the outlet funnels 18, 20 towards the outer side of the ring.

An electrode 14 is common to respectively adjacent electrolysis elements 32. Since the arrangement in the shape of a closed ring does not have any outwardly lying electrodes 34, the short-circuit line 36 of the first embodiment can be omitted.

The electrodes 14 are of a wedge-shaped design in order to compensate for the difference in the radii at the outer and inner sides of the ring 114 and thus provide a constant electrode spacing. Instead of a wedge-shaped electrode 14, two electrodes in the shape of parallelepipeds could also be used, these electrodes being inclined accordingly in relation to one another and conductively connected with one another.

Adjacent electrolysis elements 32 are not arranged exactly parallel to one another but are turned through an angle of 360°/N in relation to one another, N designating the total number of electrolysis elements 32.

The inlet funnel 38 of the first embodiment is replaced by a bottom plate 38b in the shape of a circular disk and a top plate 38a in the shape of a circular disk, which together with the electrolysis elements 32 enclose the essentially cylindrical interior of the ring 114 in an electrolyte-tight manner. The electrolyte return line 76 opens in the center of the bottom plate 38b.

The superconducting magnetic coils 40 and 42 are arranged above one another in this embodiment. Their common coil axis 44 coincides with the axis of the ring 114. The coil cross sections are circular, the inner radius of the coil cross sections is greater than the outer radius of the ring 114.

The mode of operation of the second embodiment essentially corresponds to that of the first embodiment. However, the electrolyte does not flow vertically through the electrolytic cells 12 from bottom to top but horizontally and radially from the inner side of the ring 114 consisting of electrolysis elements 32 to the outside. Due to the symmetry of this ring-shaped arrangement, the forces transferred to the ring 114 by the electrolyte flow cancel each other and so a mounting of the ring 114 consisting of electrolysis elements 32 is subjected to less wear and tear mechanically than a mounting of the linear arrangement of the electrolysis cells 32 of the first embodiment.

The present disclosure relates to the subject matter disclosed in German application No. P 19 504 632.3 of Feb. 13, 1995, the entire specification of which is incorporated herein by reference.

We claim:

1. A process for the electrolysis of a fluid electrolyte containing cations and anions in an electrolyzer having a plurality of electrolytic cells, said electrolyzer being arranged in the shape of a closed ring and each cell having a cathode and an anode located opposite the cathode, wherein each of the electrolytic cells is adjacent to two additional electrolytic cells and a current path is closed between adjacent cathodes and anodes, a magnetic field is applied to the electrolytic cells and a relative movement between the magnetic field and the electrolyte is generated so that on account of the effect of Lorentz forces the cations migrate to the cathodes and the anions to the anodes, and products of electrolysis are formed on the cathodes and on the anodes in electrolytic reactions, the charge equalization necessary for the electrolytic reactions being carried out by said closed current paths.

2. Process as defined in claim 1, characterized in that the magnetic field is stationary and that a flow of the electrolyte relative to the magnetic field is generated.

3. Process as defined in claim 2, characterized in that such a high pressure is generated in the electrolytic cell and/or such a high flow rate of the electrolyte relative to the electrodes that the products of electrolysis essentially do not mix with one another.

4. Process as defined in claim 2, characterized in that several electrolytic cells each have a branch flow of the electrolyte flowing through them.

5. Process as defined in claim 2, characterized in that the electrolyte is conveyed in a circuit.

6. Process as defined in claim 2, characterized in that the flow of the electrolyte is generated with the aid of a mechanical pump.

7. Process as defined in claim 6, characterized in that the pump is driven by a thermal engine.

8. Process as defined in claim 6, characterized in that the pump is driven by water power.

9. Process as defined in claim 2, characterized in that the flow of the electrolyte is generated with the aid of a magnetohydrodynamic pump.

10. Process as defined in claim 2, characterized in that the flow of the electrolyte is generated with the aid of a steam jet injector.

11. Process as defined in claim 10, characterized in that the injected steam is generated by partial evaporation of the electrolyte.

12. Process as defined in claim 11, characterized in that an aqueous solution is used as electrolyte.

13. Process as defined in claim 11, characterized in that an azeotropic mixture is used as electrolyte.

14. Process as defined in claim 11, characterized in that the heat required to generate the injected steam is taken from a heated working medium of a thermal power station.

15. Process as defined in claim 10, characterized in that the heat required for the steam generation is obtained from solar energy.

16. Process as defined in claim 15, characterized in that the heat required for the steam generation is temporarily stored in a heat storage unit.

17. Process as defined in claim 10, characterized in that the heat required for the steam generation is obtained geothermally.

18. Process as defined in claim 10, characterized in that the electrolyte is cooled prior to the injection of the steam such that the injected steam condenses essentially completely in the electrolyte.

19. Process as defined in claim 1, characterized in that the flow rate of the electrolyte relative to the magnetic field is at least 20 m/s and the component of the magnetic field at right angles to the flow rate of the electrolyte is at least two Tesla.

20. Process as defined in claim 1, characterized in that the magnetic field is generated by superconducting coils.

21. Process as defined in claim 1, characterized in that a liquid is used as electrolyte.

22. Process as defined in claim 1, characterized in that the energy stored in the magnetic field is used for the peak load service in electrical networks.

23. Process as defined in claim 1, characterized in that the electrolyte is water and a product of electrolysis is hydrogen.

24. An electrolyzer for the electrolysis of a fluid electrolyte, comprising a plurality of electrolytic cells, each cell having a cathode and an anode located opposite the cathode, wherein said plurality of electrolytic cells is arranged in the shape of a closed ring and the electrolyzer has conductive connections between adjacent cathodes and anodes, a device for generating a magnetic field penetrating the electrolytic cells and a device for generating a relative movement between the magnetic field and the electrolyte.

25. Electrolyzer as defined in claim 24, characterized in that the electrolyzer has a device for generating an electrolytic flow.

26. Electrolyzer as defined in claim 25, characterized in that the electrolyzer has an electrolyte circuit with an electrolyte return line.

27. Electrolyzer as defined in claim 25, characterized in that the electrolyzer has a magnetohydrodynamic pump for generating an electrolyte flow.

28. Electrolyzer as defined in claim 25, characterized in that the electrolyzer has a steam jet injector for generating an electrolyte flow.

29. Electrolyzer as defined in claim 28, characterized in that the electrolyzer has an evaporator for the partial evaporation of the electrolyte.

30. Electrolyzer as defined in claim 29, characterized in that the electrolyte is an aqueous solution.

31. Electrolyzer as defined in claim 29, characterized in that the electrolyte is an azeotropic mixture.

32. Electrolyzer as defined in claim 28, characterized in that the electrolyzer has a radiation absorber for absorbing solar energy.

33. Electrolyzer as defined in claim 32, characterized in that the electrolyzer has a heat storage unit for temporarily storing the thermal energy absorbed by the radiation absorber.

34. Electrolyzer as defined in claim 28, characterized in that the electrolyzer has a device for cooling the electrolyte, said device being arranged in front of the steam jet injector in the flow direction of the electrolyte.

35. Electrolyzer as defined in claim 24, characterized in that the electrolyzer has at least one superconducting magnetic coil.

36. Electrolyzer as defined in claim 24, characterized in that the electrolytic cell of the electrolyzer is filled with a liquid electrolyte.

37. Electrolyzer as defined in claim 24, characterized in that the electrolytic cells have bipolar electrodes.

* * * * *